2,867,404

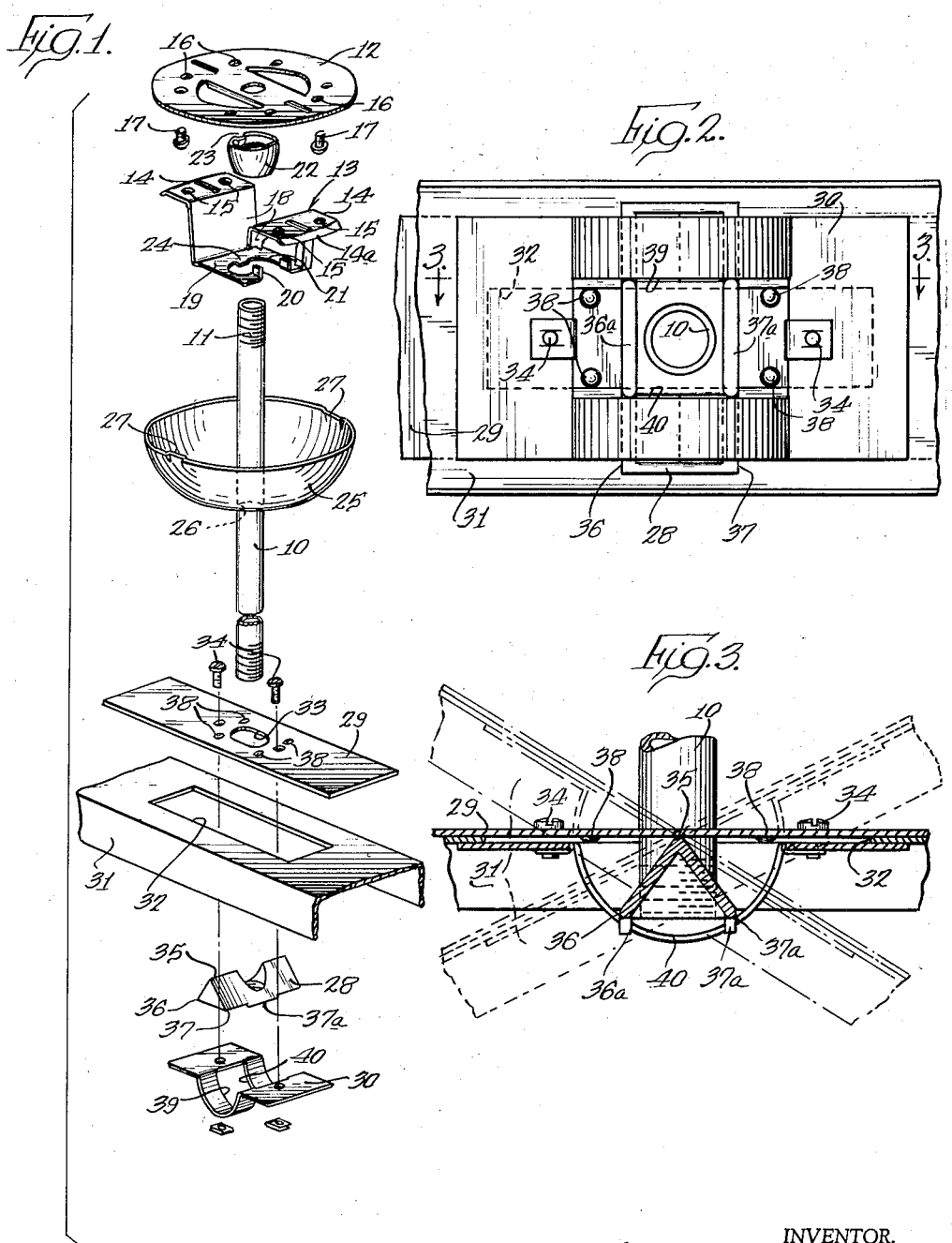

PIVOT MOUNTING FOR LIGHTING FIXTURES

Robert E. V. Ramsing, Los Angeles, Calif., assignor to Ruby Lighting Corporation, Whittier, Calif., a corporation of California Application September 23, 1957, Serial No. 685,612

7 Claims. (Cl. 248—324)

This invention relates to a pendant type lighting fixture wherein a hinged connection is provided between the lamp unit frame and the end of the tubular stem or conduit from which the frame is suspended.

It is an object of this invention to provide a pivot mounting of novel construction and arrangement.

It is also an object of this invention to provide a mounting of this type incorporating features of construction and arrangement which will accommodate angular motion of the lamp unit frame relative to the stem in a plane parallel to the longitudinal axis of the stem about an axis at selected positions along a path in a plane perpendicular to said plane of angular motion.

The present invention also provides means which greatly simplify the installation of pendant type lighting fixtures.

With the above and other objects in view, as may appear hereinafter, reference is directed to the accompanying drawings in which:

Fig. 1 is a top perspective view illustrating a lighting fixture installation incorporating the present invention, wherein the parts are shown in pre-assembled expanded arrangement.

Fig. 2 is an enlarged fragmentary top plan view of the hinge connection between the stem or conduit and the lamp unit frame in accordance with this invention.

Fig. 3 is an enlarged vertical section taken on line 3—3 of Fig. 2 with parts in dotted line to show limits of angular motion of the lamp unit frame relative to the stem.

For the purpose of illustrating a lamp fixture installation incorporating the present invention, there is shown a typical stem or conduit 10 which is threaded as at 11 at its upper end. Reference number 12 denotes a cover plate of such size and shape as to cover the under or open side of a conventional electrical junction box, not shown, to which plate a suspension bracket 13 is connected. The latter includes foot portions 14 having suitable openings 15 adapted to register with openings 16 in the plate 12 for receiving fastening members 17 to establish a rigid connection between said plate 12, the bracket 13 and the junction box. A pair of legs 18 extending downwardly and inwardly from said foot portions 14 have their lower ends joined by a suspension ring 19. An opening 20 in the side of the ring aligned with and forming a continuation of a slot 21 in one of the legs 18 provides an entrance to the area within the ring 19 for receiving a swivel ball 22 threaded on the upper end of the stem 10. The swivel ball 22 is provided with a key-way 23 which mates with a key boss 24 on the ring 19 to limit rotation of the ball relative to the ring about an axis coincident with the longitudinal axis of the stem while permitting the ball 22 to tilt about axes perpendicular to said axis of the stem. Reference number 25 indicates a canopy shell of suitable form and is provided with a center opening 26 of such size as to admit the threaded upper end of the stem 10 therethrough preparatory to assembly of the ball 22 on such end of the stem 10. Ears 27 projecting inwardly from opposite sides of the mouth of the shell 25 are engageable with downwardly inclined lip portions 14a at the edges of the foot portions 14 of the bracket 13 facing said shell to support the shell in operative relation to the stem 10.

The ball 22 and bracket 13 accordingly cooperate to provide a mounting of the stem 10 by which the latter may pivot about axes transverse to the stem 10 but which prevents rotation of the stem 10 about its own axis to avoid twisting of the wires contained in the stem.

The lower end of the stem 10 has threaded attachment to a swivel member 28 which, in cooperation with an outer clamping member 29 and an inner clamping member 30, establish a hinged connection between the stem 10 and a lamp unit frame 31. The top wall of the frame 31 is provided with an elongated entrance opening 32. The outer or upper surface of the wall of the frame 31 at opposite sides of said opening is engaged by the outer clamping member 29, said member having an opening 33 with which the opening 32 in the frame 31 cooperates to provide a passageway through which the stem is adapted to be projected for attachement to the swivel member 28 which faces the inner or lower surface of the frame 31. The latter surface of the frame is engaged at opposite sides of the entrance opening 32 by the inner clamping member 30, and threaded fasteners 34 extended through aligned openings formed in the portions of the clamping members at such distance apart as to lie within the area of the entrance opening 32 in the lamp unit frame, provide for rigidly securing the clamping members 29 and 30 on the frame 31 at selected positions lengthwise of the opening 32. The inner clamping member 30 is formed to provide a channel shaped section opening toward the frame 31 and spanning the opening 33 in the clamping member 29. The channel shaped section is concavely curved on the arc of a cylinder having its axis in a plane perpendicular to the top wall of the frame 30 and intersecting the longitudinal axis of the opening 32. As shown in Fig. 3, the swivel member is of generally triangular cross-sectionlaal contour to provide a ridge portion 35 with which the inner surface of the frame 31 at opposite sides of the stem 10 has engagement along a line parallel to the axis of the cylinder with which the channel section of the inner member conforms, and ridge portions 36 and 37 with which the channel section of said member has engagement along a pair of spaced apart lines parallel to and at equal distances from opposite sides of a plane containing said ridge portion 35 and the longitudinal axis of the stem 10. Thus the swivel member 28, when operatively positioned against the frame 31 by means of the clamping members 30 and 32 fastened to said frame, provides for the adjustment of the latter relative to the stem 10 about a transverse axis coincident with the ridge portion 35. Such angular movement is limited by the engagement of the stem 10 with the edge portions of the opening 33 in the member 29 and, as shown in Fig. 3, the size of the opening 33 is preferably such as to provide clearance needed for such swinging movement through an arc of 45° each side of a central vertical plane.

The opposite longitudinally extending edges of the entrance opening 32 in the top wall of the lamp unit frame provide guiding surfaces with which offsets 38 extending inwardly from the outer clamping member 29 have sliding engagement to locate the latter member in a fixed path of adjustment between selected positions lengthwise of said opening 32.

The channel portion of the inner clamping member 30 is preferably divided by a slot presenting edge portions 39 and 40 in spaced parallel relation axially of the axis of the swivel member 28, and the surfaces of the latter opposite said slot in alignment with the ridge portions 36 and 37 are offset as at 36a and 37a respectively in a direction to engage said edge portions 39 and 40 to prevent movement of the swivel member 28 relative to said clamping member 34 in opposite directions axially of its axis of rocking movement.

The connection thus provided by the clamping members and the swivel member as constructed and arranged in accordance with the foregoing description, makes it possible to control more advantageously the adjustment of the portion of the lamp unit frame relative to the fixed support, such as the celing, on which the outlet box or hanger associated with said lamp unit is mounted.

Furthermore, the mobility obtained at opposite ends of the stem by virtue of the present invention provides additional protection against strains applied to the joints at such ends of the stem as the result of vibrations and impacts incurred under normal operating conditions as well as shocks due to earthquakes and similar incidents.

I claim:

1. A pivot mounting for a pendant type light fixture assembly having a tubular supporting stem and a lamp supporting frame provided with an entrance opening through which an end portion of said stem is adapted to project with sufficient clearance to accommodate relative adjustment between said frame and stem along a linear path intersecting the longitudinal axis of said stem, said mounting comprising an outer clamping member straddling said stem and engaging the outer face of said frame at opposite sides of said entrance opening, an inner clamping member engaging the inner face of said frame at opposite sides of said entrance opening and having a channel shaped portion opening toward said frame and spanning the area of said frame surrounding said entrance opening, said channel portion being concavely curved on the arc of a cylinder having its axis perpendicular to said linear path of adjustment of the frame relative to the stem, means for connecting said clamping members in fixed relation to said frame and means clamped between said frame and said inner clamping member when said clamping members are in fixed relation to said frame including a swivel member connected to said stem for movement therewith.

2. A pivot mounting for a pendant type light fixture assembly having a tubular supporting stem and a lamp supporting frame provided with an entrance opening through which an end portion of said stem is adapted to project with sufficient clearance to accommodate relative adjustment between said frame and stem along a linear path intersecting the longitudinal axis of said stem, said mounting comprising an outer clamping member straddling said stem and engaging the outer face of said frame at opposite sides of said entrance opening, an inner clamping member engaging the inner face of said frame at opposite sides of said entrance opening and having a channel shaped portion opening toward said frame and spanning the area of said frame surrounding said entrance opening, said channel portion being concavely curved on the arc of a cylinder having its axis perpendicular to said linear path of adjustment of the frame relative to the stem, means for connecting said clamping member in fixed relation to said frame at selected positions along said linear path of adjustment of said stem relative to said frame and means clamped between said frame and said inner clamping member when said clamping members are in fixed relation to said frame including a swivel member connected to said stem for movement therewith.

3. A pivot mounting for a pendant type light fixture assembly having a tubular supporting stem and a lamp supporting frame provided with an entrance opening through which an end portion of said stem is adapted to project with sufficient clearance to accommodate relative adjustment between said frame and stem along a linear path intersecting the longitudinal axis of said stem, said mounting comprising an outer clamping member straddling said stem and engaging the outer face of said frame at opposite sides of said entrance opening, an inner clamping member engaging the inner face of said frame at opposite sides of said entrance opening and having a channel shaped portion opening toward said frame and spanning the area of said frame surrounding said entrance opening, said channel portion being concavely curved on the arc of a cylinder having its axis perpendicular to said linear path of adjustment of the frame relative to the stem, means for connecting said clamping members in fixed relation to said frame and means clamped between said frame and said inner clamping member when said clamping members are in fixed relation to said frame including a swivel member connected to said stem for movement therewith, said swivel member having a ridge portion with which the inner surface of the frame at opposite sides of the stem has engagement along a line perpendicular to said linear path of adjustment of the frame relative to the stem and perpendicularly intersecting the longitudinal axis of the stem, and also having a second and third ridge portion with which the channel portion of the inner clamping member has engagement along a pair of spaced apart lines parallel to and at equal distances from opposite sides of a plane containing said first ridge portion and the longitudinal axis of said stem, whereby said swivel member and the stem are adjustable relative to the frame about a transverse axis coincident with said first ridge portion.

4. A pivot mounting in accordance with claim 1, wherein interengaging means on said swivel member and said channel portion of the inner clamping member are operative to locate said swivel member in a selected position axially of said swivel member axis.

5. A pivot mounting in accordance with claim 1, wherein one of said clamping members is provided with offset portions with which opposite edge portions of the entrance opening in the frame are engageable to locate the latter clamping member in a selected position axially of said swivel member axis.

6. A pivot mounting in accordance with claim 3, wherein said channel portion of the inner clamping member is divided by a slot presenting edge portions in spaced parallel relation axially of said swivel member axis and the surfaces of the swivel member opposite said slot in alignment with said second and third ridge portions are offset in a direction to engage said edge portions of the aforesaid slot to locate said swivel member in a selected position axially of its axis.

7. A pivot mounting in accordance with claim 3, wherein said swivel member is of such contour as to have all surface areas thereof between the first and second ridge portions and between the first and the third ridge portions within the angle defined by a plane containing the first and second ridge portions and a plane containing the first and third ridge portions.

References Cited in the file of this patent

UNITED STATES PATENTS

| | | |
|---|---|---|
| 568,582 | Richards | Sept. 29, 1896 |
| 699,215 | Muller | May 6, 1902 |
| 1,993,624 | Reussenzehn | Mar. 5, 1935 |
| 2,496,094 | Johnson | Jan. 31, 1950 |